Sept. 2, 1941.  J. A. MEALS  2,254,576
OSCILLATING CHAFF RAISER
Filed April 12, 1939
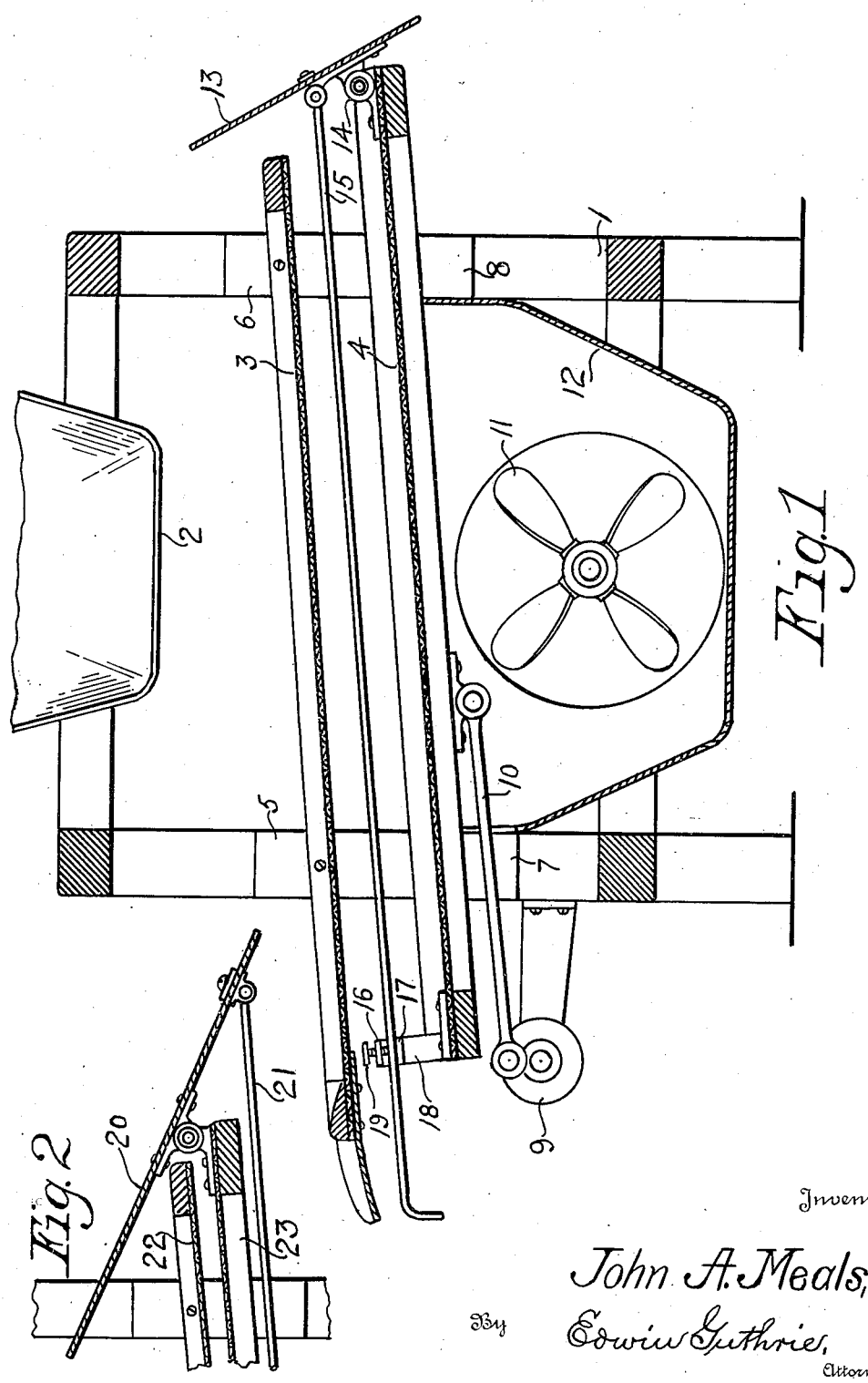
Inventor
John A. Meals,
By Edwin Guthrie,
Attorney Patented Sept. 2, 1941

2,254,576

UNITED STATES PATENT OFFICE 2,254,576

OSCILLATING CHAFF RAISER

John A. Meals, Medford, Oreg.

Application April 12, 1939, Serial No. 267,483

1 Claim. (Cl. 209—318)

This invention relates to oscillating chaff raisers, and has been found to be particularly effective in the separation of the chaff and grain in connection with harvesters of various types.

The object of the invention is the production of apparatus of the class stated having parts of special construction and arrangement for varying the different angles of movement and direction of the air blast whereby an unusually large recovery of the grain has been found practicable in the operation.

In the accompanying drawing are illustrated the parts employed and in a general manner the arrangement thereof, without limit as to the size or number of the parts or confining the invention to the precise forms set forth.

Fig. 1 represents a vertical sectional view of this apparatus showing all the parts asembled.

Fig. 2 is a fragmentary view showing a somewhat different arrangement of the sieves, and the relatively inclined position of the blast deflector.

Throughout the drawing and description the same number is used to refer to the same part.

Considering the drawing, a supporting frame 1 carries a chute 2 by way of which the grain and chaff from the harvester is directed downwardly upon the upper sieve 3 and through it onto the lower sieve 4. The upper sieve is secured as shown against positioning blocks 5 and 6 and is stationary. The lower sieve is carried upon the frame blocks 7 and 8 and is constructed and arranged to be reciprocated backwards and forwards six inches or so. The sieve 4 may be thus moved by means of the crank wheel 9 and connecting rod 10 pivotally attached to the sieve.

An air blast connection of any desired construction by means of the fan 11 delivers air into the casing 12 and upwardly through the sieves.

At the end of the lower sieve a blast deflector 13 is attached by a pivotal bearing 14, and the inclination of the deflector is controlled by the rod 15 passing to the other end of the sieve and between the lugs 16 and 17 of the post 18 carried by the lower sieve, the rod 15 being secured in place when adjusted by the set screw 19, or by any selected and equivalent devices. As shown in Fig. 1 the blast deflector is located at the end of the lower sieve. The precise size, form and supporting means may be modified within the scope of this invention.

In Fig. 2 the sieves are illustrated as arranged closed together, and the deflector 20 may be inclined well over the sieve by means of the operating rod 21. In Fig. 2 the upper sieve 22 is stationary and the lower sieve 23 reciprocates as previously explained.

In the operation the angle or inclination of the deflector is changed to any degree from horizontal to vertical, as will be necessary to divert the blast of air in respect to the sieves. By diverting the air as it comes into the machine, at different angles, it causes the air to blow up over the upper sieve, and in this manner agitates the grain chaff, seeds, etc., so that it starts the separation of the grain and chaff immediately upon the deposit of the grain and chaff onto the upper sieve. The lower sieve, particularly in certain makes of harvesters, moves backwards and forwards some six inches or so, all of which will cause the air to come through the sieves in spurts, which has the result of continuing to agitate the grain above the top sieve, making it possible for more grain to drop through onto the lower sieve and to increase the recovery of the grain. By the use of the word spurts as above it is intended to mean that as the air is driven through the sieves or screens, the reciprocation of the lower sieve 4 carrying the deflector results in varying the opening between the ends of the sieves, and the blast of air is given repeated and unequal spurts or surges between the sieves. By reason of this special operation, this invention is found to be particularly effective in use.

Having now described this invention, I claim:

In an oscillating chaff raiser, a frame, a pair of screens arranged one above the other in inclined positions, said screens being of substantially the same longitudinal extent and width, the upper screen being stationary and the lower screen being constructed and arranged to be reciprocated lengthwise, means for reciprocating the lower screen, a pivoted air deflector inclined upwardly and inwardly and carried by the end of the lower screen and movable therewith, blower means positioned centrally beneath the lower screen and constructed and arranged to produce a current of air upwardly through said screens, hand operated means for adjusting the deflector whereby the opening between the ends of the screens may be varied in extent and whereby the reciprocating movement of the lower screen with the deflector causes irregular spurts and surges of air between the screens.

JOHN A. MEALS.